US012585505B2

(12) United States Patent
    Beveridge

(10) Patent No.: US 12,585,505 B2
(45) Date of Patent: Mar. 24, 2026

(54) EXCESS CAPACITY GRID FOR ARTIFICIAL INTELLIGENCE, MACHINE LEARNING, AND LOWER PRIORITY PROCESSES

(71) Applicant: VMware LLC, Palo Alto, CA (US)

(72) Inventor: Daniel Beveridge, Valrico, FL (US)

(73) Assignee: VMware, LLC, Palo Alto, CA (US)

( * ) Notice: Subject to any disclaimer, the term of this patent is extended or adjusted under 35 U.S.C. 154(b) by 547 days.

(21) Appl. No.: 18/098,162

(22) Filed: Jan. 18, 2023

(65) Prior Publication Data

US 2024/0241763 A1    Jul. 18, 2024

(51) Int. Cl.
    *G06F 9/50*      (2006.01)
    *G06F 9/455*     (2018.01)
(52) U.S. Cl.
    CPC ........ *G06F 9/5072* (2013.01); *G06F 9/45558* (2013.01); *G06F 9/5038* (2013.01); *G06F 9/5077* (2013.01); *G06F 2009/4557* (2013.01)
(58) Field of Classification Search
    None
    See application file for complete search history.

(56) References Cited

U.S. PATENT DOCUMENTS

| | | | |
|---|---|---|---|
| 2009/0254998 A1* | 10/2009 | Wilson | G06F 9/5027 709/201 |
| 2015/0154056 A1* | 6/2015 | Chen | G06F 9/4856 718/103 |
| 2020/0301740 A1* | 9/2020 | Gabrielson | G06N 3/08 |
| 2021/0014113 A1 | 1/2021 | Guim Bernat et al. | |

OTHER PUBLICATIONS

Extended European Search Report, European Application No. 24152429.7 dated Mar. 7, 2024, 17 pages.

* cited by examiner

*Primary Examiner* — Qing Yuan Wu
(74) *Attorney, Agent, or Firm* — King Intellectual Asset Management

(57) ABSTRACT

Aspects of providing an excess capacity grid for artificial intelligence, machine learning, and lower-priority processes are described. A grid orchestration client is installed on a virtual machine or a physical device that performs a production workload for an enterprise. The grid orchestration client communicates with a grid orchestration server as part of an excess capacity grid that performs grid workloads. A request to execute a grid workload is received. The grid orchestration client causes the grid workload to be executed.

20 Claims, 6 Drawing Sheets

EXCESS CAPACITY GRID FOR ARTIFICIAL INTELLIGENCE, MACHINE LEARNING, AND LOWER PRIORITY PROCESSES

BACKGROUND

Management and virtualization services can provide and manage a virtualized computing environment. The virtualized computing environment can include various host devices that can provide hardware resources for executing virtual machines and other virtualized devices such as containers and other types of virtual devices that perform various tasks for an enterprise.

Enterprise level customers that employ management and virtualization services can seek greater return on investment from their server investments as they embrace modern applications. However, many enterprise customers have the majority of their server hardware resources sitting idle for most of the day, as many can be utilized primarily or exclusively during business hours in a respective time zone. These server hardware resources can be idly utilizing a high percentage of their peak energy expenditure without providing explicit value during unused time. Further, even within business hours, the usage of the overall virtualized computing environment can generally include high levels of excess capacity.

With greater concern than ever about the carbon footprint of information technology, enterprise customers are also seeking ways of engaging energy intensive workloads like machine learning model training, artificial intelligence, functions as a service (FaaS) and other long running processes, while minimizing cost and carbon footprint.

DETAILED DESCRIPTION

The present disclosure relates to providing an excess capacity grid for artificial intelligence, machine learning, long running processes, and lower priority processes. Spare capacity can emerge in enterprise settings for a variety of reasons. Data indicates that the average customer CPU utilization in many enterprise deployments can be around 25% and even lower on larger clusters. Enterprise customers can deploy servers well ahead of consumption based on budget and hardware resource availability, requirements for installation lead-time, and so on. Once available, business units have their own ramp-up time before installing new hardware. Business units can also purchase or deploy ahead of demand, anticipating future shortages in finance or relative hardware availability. Moreover, cluster sizing tends to be very conservative at the enterprise level, targeting anticipated peak utilization as the basis for sizing, and operating on a risk averse provisioning paradigm.

Customers looking to aggressively stack workloads based on peak/off-peak times of day or other stacking strategies can face challenges in the provisioning and lifecycle management of the additional fleets of virtual machines needed to service these new workloads including change control, staging, and labor associated with these activities. There is also the overhead of various software agents such as anti-virus and management agents that are often required by policy to be placed into a standard corporate image, storage and networking requirements, and other platform requirements.

Rather than creating large numbers of new virtual machines deployed on additional hardware resources to service selected workloads, the present disclosure describes mechanisms that leverage unique attributes of web assembly to form excess capacity grids that provide secure, fully sandboxed, and efficient execution of workloads within existing virtual machines. As one skilled in the art will appreciate in light of this disclosure, certain embodiments of the disclosed can achieve certain advantages, including some or all of the following: (1) improving the functioning of the computer network by a compute grid that uses fewer physical compute and memory resources for the overall deployment of all enterprise workloads in the computing environment, (2) enhancing flexibility of a computer network by enabling dynamic deployment of artificial intelligence and machine learning processes on unused or under-utilized compute and memory resources without specialized accelerator hardware typically used for these processes (3) reducing the overall energy usage and carbon footprint of workloads in the computer network relative to the energy usage of the same workloads if processed using a standard server deployment, and so forth. In the following discussion, a general description of the system and its components is provided, followed by a discussion of the operation of the same.

Figure 1:
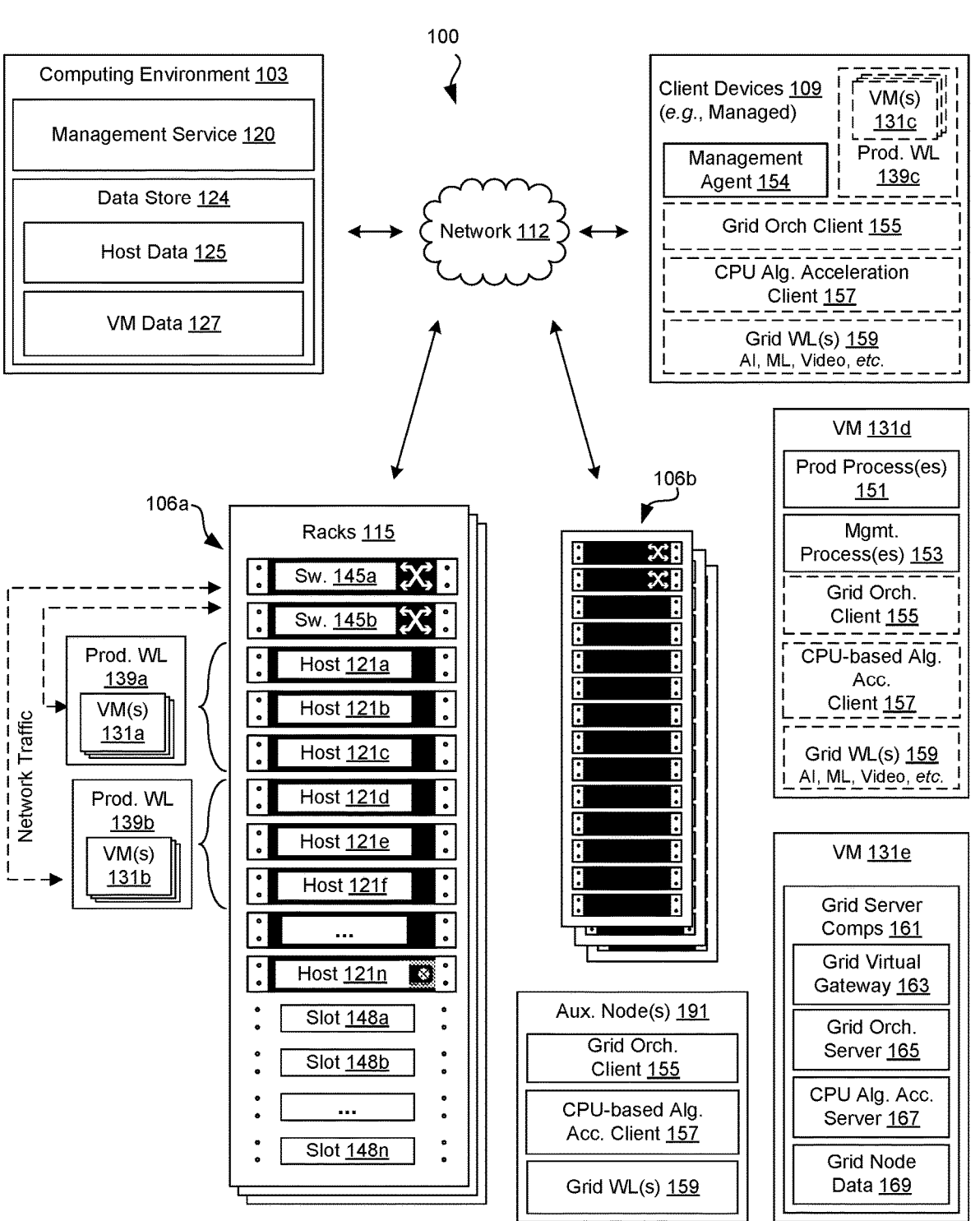
FIG. 1 is an example of a block diagram of a networked environment including a virtualization computing environment according to various examples of the disclosure.

FIG. 1 shows an example of a networked environment 100. The networked environment 100 can include a computing environment 103, various computing clusters 106 (e.g., 106a, 106b), and one or more client devices 109 in communication with one another over a network 112. The network 112 can include wide area networks (WANs) and local area networks (LANs). These networks can include wired or wireless components, or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FIR), BLUETOOTH® networks, microwave transmission networks, Long Term Evolution (LTE) networks, as well as other networks relying on radio broadcasts. The network 112 can also include a combination of two or more networks 112. Examples of networks 112 can include the Internet, intranets, extranets, virtual private networks (VPNs), and similar networks. The networked environment 100 can serve up virtual desktops to end users and can include a virtual desktop infrastructure (VDI) environment. The networked environment 100 can manage client devices 109 and other endpoints and can include a universal endpoint management environment.

In some examples, the computing environment 103 can include an enterprise computing environment that includes hundreds or even thousands of physical machines, virtual machines, and other software implemented in devices stored in racks 115, distributed geographically across locations or sites that include computing clusters 106 (e.g., computing clusters 106a, 106b) and connected to one another through the network 112. It is understood that any virtual machine or virtual appliance is implemented using at least one physical device. While the disclosure refers to virtual machines as providing certain functionalities, the functionalities provided by virtual machines can alternatively be provided by pods, containers, and other virtualized devices and virtualized environments.

The computing environment 103 can include, for example, a server or any other system providing computing capability. Alternatively, the computing environment 103 can include one or more computing devices that are arranged, for example, in one or more server banks, computer banks, computing clusters, or other arrangements. The computing environment 103 can include a grid computing resource or any other distributed computing arrangement. The computing devices can be located in a single installation or can be distributed among many different geographical locations.

Although shown separately from the computing clusters 106, in some examples, one or more of the computing clusters 106 can provide the hardware backing for all or a portion of the computing environment 103. Generally, the computing clusters 106 that are a portion of the computing environment 103 are those that are Internet Protocol (IP) accessible to the management service 120 and all of the hosts 121 of the computing environment 103.

Various applications can be executed on the computing environment 103. For example, a management service 120 can be executed by the computing environment 103. Other applications, services, processes, systems, engines, or functionality not discussed in detail herein may also be executed or implemented by the computing environment 103.

The computing environment 103 can include or be operated as one or more virtualized computer instances. For purposes of convenience, the computing environment 103 is referred to herein in the singular. Even though the computing environment 103 is referred to in the singular, it is understood that a plurality of computing environments 103 can be employed in the various arrangements as described above. As the computing environment 103 communicates with the computing clusters 106 and client devices 109 for end users over the network 112, sometimes remotely, the computing environment 103 can be described as a remote computing environment 103 in some examples. Additionally, in some examples, the computing environment 103 can be implemented in hosts 121 (e.g., 121a ... 121n) of a rack 115 and can manage operations of the virtualized computing environment 103. Hence, in some examples, the computing environment 103 can be referred to as a management cluster in the computing clusters 106.

The computing environment 103 can include a data store 124. The data store 124 can include memory of the computing environment 103, mass storage resources of the computing environment 103, or any other storage resources on which data can be stored by the computing environment 103. The data store 124 can include memory of the hosts 121 in some examples. In some examples, the data store 124 can include one or more relational databases, object-oriented databases, hierarchical databases, hash tables or similar key-value data stores, as well as other data storage applications or data structures. The data stored in the data store 124, for example, can be associated with the operation of the various services or functional entities described below. For example, host data 125, virtual machine data 127, and/or other data can be stored in the data store 124.

In various embodiments, the management service 120 can include a computer program that resides and executes in a central server, which may reside in the computing environment 103, and can run in a virtual machine 131 (e.g., 131a ... 131e) in one of hosts 121 or edge devices 107. One example of a virtualization management module or virtualization service is the vCenter Server® product made available from VMware, Inc. The management service 120 is configured to carry out administrative tasks for a virtualized environment, including managing hosts 121, managing a production workload 139 (e.g., 139a ... 139c), managing virtual machines 131 running within each host 121, provisioning virtual machines 131, migrating virtual machines 131 from one host 121 to another host 121, and load balancing between the hosts 121. In one embodiment, the management service 120 can manage and integrate virtual computing resources provided by a third party cloud computing system with virtual computing resources of the management service 120 to form a unified "hybrid" computing platform.

The management service 120 includes a resource management service and/or other applications. The resource management service can be executed to allocate production workloads 139 (e.g., 139a ... 139c) to one or more hosts 121 based on various factors. For example, the resource management service can add an extra host 121 to the set of hosts 121 assigned to a production workload 139 in response to an increase in demand for computing resources. As another example, the resource management service can reassign production workloads 139 or virtual machines 131 within a production workload 139 from one host 121 to another host 121 in order to more effectively use the hosts 121 assigned to the production workload 139.

For example, if a first host 121 is scheduled for an upgrade, the resource management service can reassign the virtual machines 131 executing on the first host 121 to a second host 121 based on various factors that can be used to identify the second host 121 as the best candidate host 121 among other hosts 121 in the data center. The resource management service can include a number of modules and components that work in concert for the management of the hosts 121 and production workloads 139. For example, the resource management service can include VSphere™ High Availability (HA), VMware Distributed Resource Scheduler (DRS), VMware VCenter™ Server, and other VMware VSphere™ components. The various components of the resource management service can work in concert to achieve the functionalities described for the resource management service.

The host data 125 can contain information about the hosts 121 that are managed by the management service 120. For example, the host data 125 can include information such as the amount of memory installed on the host 121, the number and type of processors installed on the host 121, the number and type of GPUs installed on the host 121, the number and type of network connections installed on the host 121, and various other data. The host data 125 can also include a record of the production workload(s) 139 (e.g., specific virtual machines 131) performed by particular host(s) 121.

Virtual machine data 127 represents information about the virtual machines 131 that are executed by the hosts 121 within the virtualized computing environment 103. The virtual machine data 127 can include allocated CPU, memory, and storage resources for the various virtual machines 131, network configuration for the virtual machines 131, or an operating system (OS) image for the virtual machines 131. The virtual machine data 127 can also include certificate data, encryption data, security credentials, or other data needed to configure and operate the virtual machines 131 within the virtualized computing environment 103.

In various embodiments, the computing clusters 106 can include a plurality of devices installed in racks 115, which can make up a server bank, aggregate computing system, or a computer bank in a data center or another like facility. In some examples, the computing cluster 106 can include a high-availability computing cluster. A high-availability computing cluster can include a group of computing devices that act as a single system and provides a continuous uptime for workloads. The devices in the computing clusters 106 can include any number of physical machines that perform workloads that include, virtual machines, virtual appliances, OSs, drivers, hypervisors, scripts, and applications.

The devices in the racks 115 can include, for example, memory and storage devices, hosts 121a . . . 121n, switches 145a . . . 145b, and other devices. Hosts 121 can include graphics cards having one or more graphics processing units (GPUs) installed thereon, central processing units (CPUs), power supplies, and other components. The devices, such as hosts 121 and switches 145, can have dimensions suitable for quick installation in slots 148a . . . 148n on the racks 115. In various examples, the hosts 121 can include requisite physical hardware and software to create and manage a virtualization infrastructure. The physical hardware for a host 121 can include a CPU, graphics card (having one or more GPUs), data bus, memory, and other components. In some examples, the hosts 121 can include a pre-configured hyper-converged computing device where a hyper-converged computing device includes pre-tested, pre-config-ured, and pre-integrated storage, server and network com-ponents, including software, which are positioned in an enclosure installed in a slot 148 on a rack 115.

The various physical and virtual components of the com-puting clusters 106 can process a production workload 139. A production workload 139 can represent individual virtual machines 131 and sets of virtual machines 131 executed on the hosts 121. The virtual machines 131 can embody or include various applications that are executed for an orga-nization or enterprise. The virtual machines 131 can provide functionalities including applications, data, and network functions to the client devices 109. Generally, the virtual machines 131 can be instantiated to provide production workloads 139, such as VDI services, remote desktop ses-sion host (RDSH) services, software as a service (SaaS), and so on. However, the present disclosure describes mecha-nisms that maximize usage of existing virtual machines 131 to provide an excess capacity grid that can be leveraged to execute grid workloads 159, corresponding to excess capac-ity workloads or workloads that are conducive to execution using excess capacity. Grid workloads 159 can generally include artificial intelligence processes, machine learning training processes, video and other encoding/transcoding, long running processes, userless processes that lack or minimize user interaction, functions as a service (FaaS), and other lower priority processes.

In addition to a virtual machine 131, a production work-load 139 can correspond to or be provided using other components running on the host 121. These can include one or more containers of Kubernetes® pods, one or more vSAN® components, one or more data transport connec-tions, one or more network functions, and other components. The various components can provide functionalities that can be accessed by various client devices 109 for enterprise purposes.

Production workloads 139 can be executed on a host 121 that runs a hypervisor that facilitates access to the physical resources of the host device by the production workload 139 running atop the hypervisor. In some examples, the hyper-visor can be installed on a host 121 or an edge device 107 to support a virtual machine execution space wherein one or more virtual machines can be concurrently instantiated and executed. In some examples, the hypervisor can include the VMware ESX™ hypervisor, the VMware ESXi™ hypervi-sor, or similar hypervisor.

A hardware computer device such as a host 121 can execute an instance of one or more virtual machines 131. Each host 121 that acts as a host in the networked environ-ment 100, and thereby includes one or more virtual machines 131, can also include a hypervisor. In some examples, the hypervisor can be installed on a host 121 to support a virtual machine execution space wherein one or more virtual machines 131 can be concurrently instantiated and executed. In some examples, the hypervisor can include the VMware ESX™ hypervisor, the VMware ESXi™ hyper-visor, or similar hypervisor. It is understood that the com-puting clusters 106 are scalable, meaning that the computing clusters 106 in the networked environment 100 can be scaled dynamically to include additional hosts 121, switches 145, power sources, and other components, without degrading performance of the virtualization environment. Further, vari-ous physical and virtual components of the computing clusters 106 can process production workloads 139. Produc-tion workloads 139 can refer to the amount of processing that a host 121, switch 145, GPU, or another physical or virtual component has been instructed to process or route at a given time. The production workload 139 can be associ-ated with virtual machines 131 or other software executing on the hosts 121.

In some examples, a management service 120 can com-municate with a management agent 154 of a client device 109 to launch, migrate, and otherwise provide a production workload 139c including the virtual machines 131c. How-ever, some client devices 109 are used to access production workloads 139 additionally or alternatively to executing production workloads 139. The client device 109 can rep-resent a computing device coupled to the network 112. The client device 109 can be a processor-based computer system. According to various examples, the client device 109 can be in the form of a desktop computer, a laptop computer, a personal digital assistant, a mobile phone, a smartphone, or a tablet computer system. The client device 109 can execute an OS, such as Windows™, Android™, or iOS®, and has a network interface to communicate with the network 112.

The components of an excess capacity grid can include excess capacity grid nodes that execute respective instances of a grid orchestration client 155. The components of an excess capacity grid can include excess capacity server nodes that execute respective instances of grid server components 161. Grid server components 161 can orchestrate deployment and distribution of grid workloads 159 across the excess capacity grid nodes. The grid nodes can include many nodes.

The grid node architecture can also enable the usage of auxiliary nodes 191, which can be used as auxiliary grid nodes. Auxiliary nodes 191 can be provided using pods of containers, such as Kubernetes® pods and Kubernetes® containers. Auxiliary nodes 191 can be instantiated and utilized if available "excess capacity" grid nodes corresponding to virtual machines 131 and client devices 109 are insufficient for a request to perform a grid workload 159. The grid server components 161, such as the grid virtual gateway 163, can dynamically scale capacity and number of auxiliary nodes 191 based on the availability and capacity of the excess capacity grid nodes, capacity of the auxiliary nodes 191, a number of the grid workloads 159, and a capacity requirement of the grid workloads 159. While a single auxiliary node 191 can perform an entire grid workload 159, in other examples, an auxiliary node 191 can perform a fraction of portion of a distributed grid workload 159. In some cases, an auxiliary node 191 can correspond to a container, and various containers can perform different portions of a distributed grid workload 159.

The auxiliary nodes 191 in some examples are not considered to be "excess capacity" nodes, since their primary purpose can be to perform grid workloads 159 rather than production workloads 139. As a result, this can form a hybrid grid node architecture that uses both excess capacity grid nodes and auxiliary nodes 191. With this in mind, the auxiliary nodes 191 can be considered "auxiliary grid nodes" in a hybrid grid node architecture. The "excess capacity grid nodes" can correspond to virtual machines 131 and client devices 109 that execute a grid orchestration client 155 and a production workload 139 among other components.

The auxiliary nodes 191 can be dynamically scaled as a cluster such as a Ray® cluster. The grid server components 161 can include a cluster component capable of dynamically scaling a number of and capacity for the auxiliary nodes 191. The grid server components 161 can include a pod and container server component such as a Kubernetes® server. The grid server components 161 can include an operator or set of tools that enables using cluster management integration tool for a pod and container environment, for example, a KubeRay operator that enables Ray for Kubernetes pods and containers.

The virtual machines 131 can include privately hosted virtual machines 131 managed directly by the management service 120 and executing management processes 153. The virtual machines 131 can include public or cloud-hosted virtual machines 131 that are managed directly by the management service 120 and executing management processes 153. However, the virtual machines 131 can include public or cloud-hosted virtual machines 131 that are managed indirectly by the management service 120 and lack or omit the management processes 153. Nevertheless, the management service 120 can cause the virtual machines 131 to execute an instance of the grid orchestration client 155, as discussed in further detail below. The management service 120 can cause the management agent 154 to launch the grid orchestration client 155 to provide an excess capacity grid node.

The virtual machine 131d is an example of a virtual machine 131 directly managed by the management service 120. The virtual machine 131d can initially include production processes 151 and management processes 153, but can lack or omit the grid orchestration client 155. Other examples can include the grid orchestration client 155 on initial launch and execution of the virtual machine 131d. In a situation where the virtual machine 131d initially lacks the grid orchestration client 155, installing the grid orchestration client 155 can pose a logistical problem. For example, the virtual machine 131d, its guest operating system, and/or a hypervisor that launches the virtual machine 131d can require administrative or privileged credentials in order to install additional applications and processes on the virtual machine 131d.

The production processes 151 can refer to the primary processes that constitute applications or executables to perform a requested enterprise functionality for any of the production workloads 139. The management processes 153 can refer to management tools in communication with the management service 120 for management of the virtual machine 131d. The management tools can include a set of services and modules that enable features for various different management service 120 functionalities discussed above. The management processes 153 provide for management of, and seamless user interactions with, guests operating systems and other aspects of the virtual machine 131d. The management tools and other management processes 153 can have access to privileged or administrative credentials, and so the management service 120 can transmit instructions for managed virtual machines such as the virtual machine 131d to launch an instance of the grid orchestration client 155.

Excess capacity grid client components such as the grid orchestration client 155, the CPU-based algorithmic acceleration client 157, and the grid workload 159 can execute in a single web assembly (WASM) sandbox or multiple web assembly sandboxes. A web assembly sandbox can utilize a binary instruction format and can be designed as a portable compilation target. This can enable deployment of the various excess capacity grid client components as client applications in a way that is securely insulated from the production processes 151 within the same virtual machine 131. The web assembly based sandbox environment can be encoded in an efficient binary format that is efficient in both data size and loading time. The web assembly sandbox can be a memory-safe, sandboxed execution environment that can be implemented inside existing virtual machines 131. In some examples of web deployment, web assembly sandbox can enforce security policies such as same-origin policies and permissions policies. The web assembly sandbox can enforce a default 'zero-trust' posture, which makes it well suited for deployment inside managed enterprise virtual machines 131 that need assurance that whatever happens within the web assembly sandbox cannot compromise the security of the primary function, such as executing production processes 151.

The grid orchestration client 155 can be responsible for receiving and executing commands and configurations of the other client components of the excess capacity grid such as the grid workload 159 and the CPU-based algorithmic acceleration client 157. The grid orchestration client 155 can execute in a masterless mode if a single virtual machine 131 is responsible for the entire grid workload 159. Generally, however, the grid orchestration client 155 can be associated with a grid orchestration server 165 that acts as a primary or master for many grid orchestration clients 155 corresponding to excess capacity nodes. A grid orchestration client 155 can install and execute various items of software within one or more web assembly sandbox within the virtual machine 131 where it is executed. The grid orchestration server 165 can implement commands and requests from the grid orchestration server 165, including commands to install and execute various items of software. In the context of the present disclosure, the software can include a grid workload 159 as well as the prerequisite software components or environment including the CPU-based algorithmic acceleration client 157. While the CPU-based algorithmic acceleration client 157 can be a separate executable from the grid workload 159, it can also be considered part of the grid workload 159. In some examples, the CPU-based algorithmic acceleration client 157 and the grid workload 159 can be packaged together as an installation package for the grid orchestration client 155 to install. The installation package can also include a script that configures the CPU-based algorithmic acceleration client 157 to enable performing or executing of the grid workload 159.

The grid orchestration client 155 can have access to tools that can monitor and identify total resources, resource usage, grid workload 159 resource usage, non-grid workload resource usage, production process 151 resource usage, and all processes executed using a grid node such as a virtual machine 131 or a client device 109. The grid orchestration client 155 can report this information on registration with a grid orchestration server 165, as well as periodically identify and report this information from the grid node to the grid orchestration server 165 and other grid server components 161. The grid orchestration server 165 and other grid server components 161 can save the information as grid node data 169.

The grid orchestration client 155 can also identify a minimum privilege level for all workloads or processes executed using the grid node, and can start the grid workload 159, including the CPU-based algorithmic acceleration client 157, at a privilege level lower than (or equal to) the lowest privilege level of production workloads 159 associated with that grid node. Alternatively, the lowest privilege level available on the grid node can be used. For example, a WINDOWS™ based node may have high, normal, and low priority. In either case, this can prevent the grid workload 159 from slowing down the higher priority production processes 151 of the production workload 139. As an additional or alternative precaution, the grid orchestration client 155 (and the grid orchestration server 165) can identify grid node resource usage and implement a usage policy. For example, the grid orchestration client 155 can decline to install and/or execute a grid workload 159 if overall usage or production workload 139 usage is beyond a predetermined percentage of total resources reported for the node, such as 30% or another deployment or execution threshold. The grid orchestration client 155 can halt or suspend the grid workload 159 if the other processes excluding the grid workload 159 are beyond a suspension threshold such as 70% or another value.

The CPU-based algorithmic acceleration client 157 can include an engine that uses standard processors such as standard CPUs rather than specialized processors of GPUs and DPUs for training machine learning models. This algorithmic acceleration using standard CPUs can train neural networks and deep learning models in far fewer floating point operations per second (e.g., 1% or fewer), unlike GPU and DPU techniques like quantization, pruning, and structured sparsity. The CPU-based algorithmic acceleration client 157 can provide high performance using CISC and RISC platforms on standard Intel, AMD, and ARM processors, and can do so faster than the specialized techniques used by GPUs and DPUs.

Grid workloads 159 can generally include artificial intelligence processes, machine learning training processes, video and other encoding/transcoding, long running processes, userless processes that lack or minimize user interaction, functions as a service (FaaS), and other lower priority processes.

The grid server components 161 can include a grid virtual gateway 163, a grid orchestration server 165, a CPU-based algorithmic acceleration server 167, and grid node data 169. The grid server components 161 can be executed in the cloud or public WAN such that inbound connections are open for the grid client components. However, the grid orchestration server 165, the grid virtual gateway 163, and the CPU-based algorithmic acceleration server 167 can be executed in a public or private LAN or WAN, as long as the inbound connections are open for the grid client components. Generally, this means that the grid server components 161 can be executed within a private network, but only the same private LAN or WAN where the grid nodes managed by that set of grid server components 161 are located.

The grid virtual gateway 163 can refer to a virtual gateway appliance that exposes application programming interfaces (APIs) that a developer, administrator, or enterprise user can invoke to deploy grid workloads 159 for execution using the excess capacity grid client components. The APIs can include representational state transfer (REST) APIs. The grid virtual gateway 163 be invoked to request/reserve a specified number of nodes (VMs), to check total available nodes, to launch a job and specify what grid workloads 159 to deploy on a specified number of nodes for a specified period of time, and so on. For example, a request or call can specify a particular number of nodes, a specified period of time for machine learning training, and a grid workload 159 or installation package to install.

In some examples, the number of nodes can be specified in an API request that includes an arbitrary or friendly name as a parameter such as "small," "medium," "large," and so on. The grid virtual gateway 163 can identify how many nodes are available at the current time, and determine how many nodes to map into the request. The grid virtual gateway 163 can have threshold rules that specify that the mapped number of nodes should be no more than a rule-based percentage of available nodes for a single request. In some cases, The grid virtual gateway 163 can use the higher of a static number or the rule-based percentage that is mapped to a corresponding friendly parameter. This mapping layer between the request parameter and specific instantiation of node count for the request can make usage more friendly for enterprise users.

The grid orchestration server 165 can be executed co-located in the same virtual machine 131 as the grid virtual gateway 163, or another virtual machine 131 that is addressable and accessible to the grid virtual gateway 163. The grid orchestration server 165 can use ZeroMQ, RabbitMQ, or another high performance asynchronous messaging library that allows communication to flow between the grid orchestration clients 155 and the grid orchestration server 165 without the need to open any inbound networking ports on the operating system and virtual machine 131 where the grid orchestration client 155 is installed. This non-intrusive communication profile can enable deployment into existing virtual machines 131 without the need for any operating system level firewall changes. The grid orchestration communication framework, including the grid's server and client components, can be used to instruct any one or more grid orchestration clients 155 to install and configure a WASM environment, instantiate specific WASM packages for the grid workloads 159, and initiate a script that configures execution of the grid workload 159 components with specific parameters. Resultant data or parameters can be bridged from the WASM instance onto a grid orchestration bus and delivered to an application using the grid orchestration server 165.

The grid orchestration server 165 can be located in any network such that the network address of the grid orchestration server 165 is available and accessible to the grid orchestration client 155. For example, In the various configurations, the grid orchestration server 165 can be located in a public WAN, a public LAN, or the same private LAN or private WAN as the grid orchestration client 155.

While the grid orchestration server 165 can be openly accessible and addressable by the grid orchestration client 155, there is no need for the grid orchestration client 155 to be open in this way. Once configured, the grid orchestration server 165 and the grid orchestration client 155 can communicate with one another using an asynchronous messaging library that allows communication to flow between the grid orchestration clients 155 and the grid orchestration server 165 without the need to open any inbound networking ports on the operating system and virtual machine 131 where the grid orchestration client 155 is installed.

The CPU-based algorithmic acceleration server 167 can be a server component that works along with the CPU-based algorithmic acceleration client 157. The CPU-based algorithmic acceleration server 167 can, along with the other grid server components 161, fragment a grid workload 159 into a predetermined or selected number of chunks for distribution and execution as a distributed workload on multiple grid nodes that execute instances of the CPU-based algorithmic acceleration client 157. The CPU-based algorithmic acceleration server 167 can also collect the results returned from the CPU-based algorithmic acceleration clients 157 and form a final result for delivery to the original requesting user or process.

Grid node data 169 represents information about the grid nodes that are executed within the computing environment 103. The grid node data 169 can include allocated CPU and memory (e.g., RAM) periodically identified and reported by the grid orchestration client 155 for the various processes executed, according to grid node. The grid node data 169 can include total resources, resource usage, grid workload 159 resource usage, non-grid workload resource usage, production process 151 resource usage, and all processes executed using a grid node such as a virtual machine 131 or a client device 109.

Figure 2:
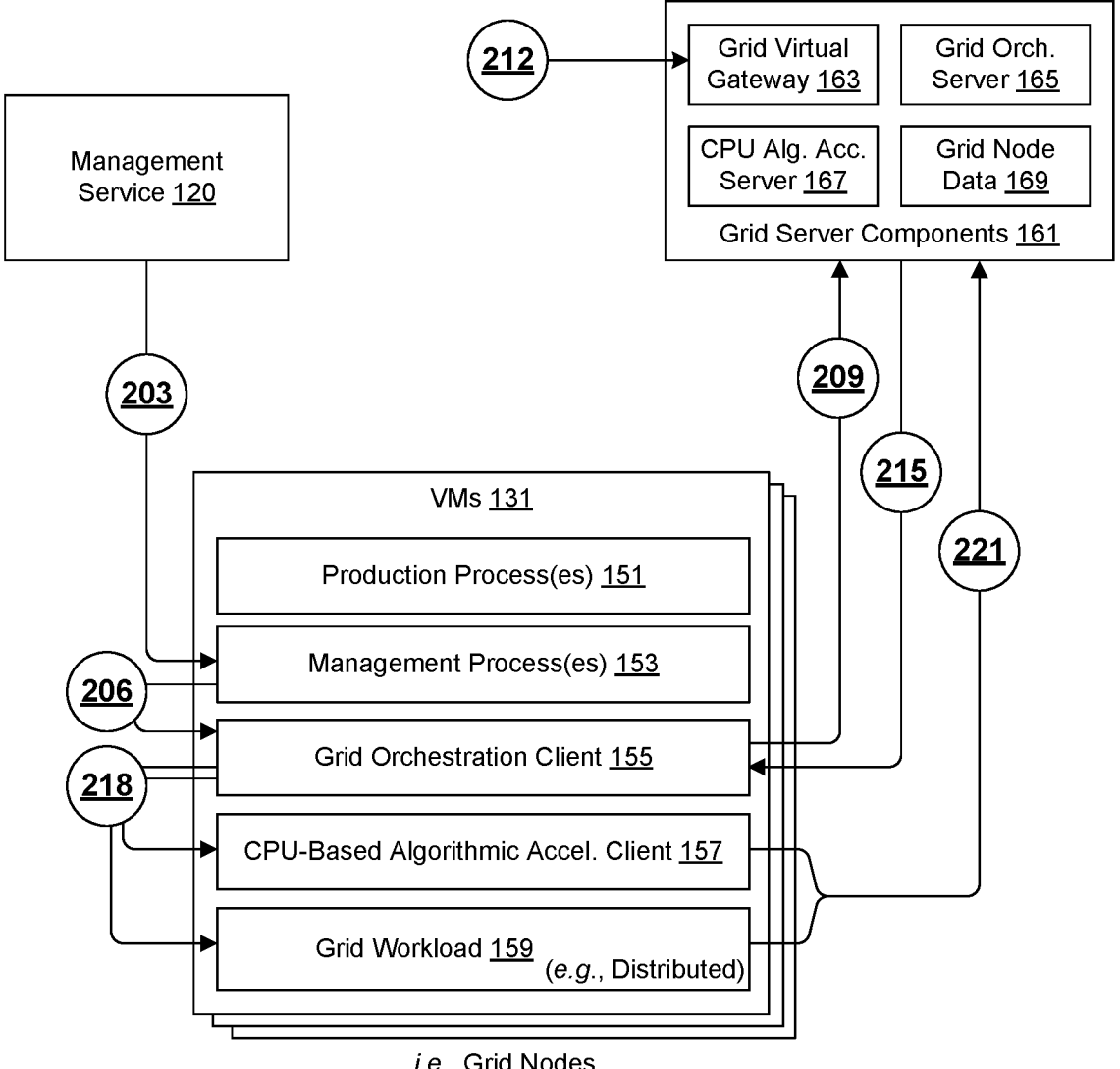
FIG. 2 is a drawing that shows an example of functionalities performed by components of the networked environment to provide an excess capacity grid for lower priority processes, according to various examples of the disclosure.

FIG. 2 shows an example of the operation of the components of the networked environment providing an excess capacity grid for grid workloads 159. Generally, this figure shows how components of the networked environment 100 can form grid nodes using managed virtual machines 131 that include the management processes 153. While particular steps can be described as performed by a particular component, other components can additionally or alternatively perform the functionalities discussed.

In step 203, the management service 120 can transmit a command or request for the management process 153 to install and execute a grid orchestration client 155 on the virtual machine 131. The virtual machine 131 or its guest operating system can require administrative or privileged credentials to install and execute applications. The command to install and execute the grid orchestration client 155 can include instructions and other data that configure the grid orchestration client 155 to register with and communicate with the grid orchestration server 165. The configuration data for of the grid orchestration client 155 can include a network address of the grid orchestration server 165 and credentials to authenticate the grid orchestration client 155 with the grid orchestration server 165.

In step 206, the management process 153 can install and execute the grid orchestration client 155 on the virtual machine 131. This can cause the virtual machine 131 to be available as an excess capacity grid node. The management process 153 can include the credentials or can operate at a privilege level based on the credentials, enabling the management process 153 to install and execute the grid orchestration client 155.

In step 209, the grid orchestration client 155 can register and communicate with the grid orchestration server 165. Initially, the grid orchestration client 155 can communicate with the grid orchestration server 165 using the network address and authenticate this communication using the credentials from the orchestration client configuration data. In some examples this can be considered a registration request. Thereafter, the grid orchestration server 165 and the grid orchestration client 155 can communicate with one another using asynchronous messaging. The grid orchestration client 155 can identify the total CPU capacity and memory capacity of the virtual machine 131 and report this to the grid orchestration server 165. The CPU capacity can refer to a physical number of CPUs of the virtual machine 131, a number correlated with an efficacy or speed score of the CPU or CPUs of the virtual machine 131, or another measure of CPU capacity. The grid orchestration server 165 can create a new grid node identifier or use a network address or other parameter of the grid orchestration client 155 as a grid node identifier, and can store the total CPU and memory capacity in the grid node data 169 in association with this identifier. The identifier can be universally unique or unique among all grid nodes associated with this grid orchestration server 165 instance.

In step 212, the grid virtual gateway 163 can receive a request to use the excess capacity grid to execute a grid workload 159 and/or its prerequisite software components. The grid virtual gateway 163 can expose an API that can be invoked using a request that specifies a node parameter such as a specific number of nodes, or a friendly name associated with a relative resource requirement of the grid workload 159. The request can also specify the grid workload 159 by an identifier associated with the grid workload 159, a network address where the grid workload 159 can be downloaded, or the grid workload 159 can be included within the request. The request can also specify a minimum resource requirement including a minimum CPU capacity and a minimum memory capacity for the grid workload 159.

The grid virtual gateway 163 can use the parameters of the request to identify a subset of grid nodes to execute the grid workload 159 as a distributed application. In this context, the grid workload 159 shown in the figure can represent a portion of a distributed application or workload. This can include interaction with the other grid server components 161. The grid server components 161 can, based on the request, identify a set of all grid nodes that correspond to the minimum CPU capacity and a minimum memory capacity for the grid workload 159. In other words, the grid server components 161 can identify the subset of the grid nodes that have a respective CPU capacity and memory capacity equal to or greater than the specified minimum CPU capacity and a minimum memory capacity.

The grid server components 161 can also identify, for each grid node, a most recent reported usage data measure corresponding to any measure such as a most recent instantaneous usage value, a most recent average over a certain period of time, or other most recent statistical measure. This measure of resource usage can be expressed as a percentage of total capacity. The grid server components 161 can identify a subset of the grid nodes that are at or below a predetermined threshold usage measure for one or more resources including CPU and memory.

The grid server components 161 can ultimately select a subset of the grid nodes that both (1) correspond to the minimum total CPU capacity and a minimum total memory capacity for the grid workload 159, and (2) are at or below a predetermined threshold usage measure for one or more resources including CPU and memory. Additional considerations can also be specified in predetermined threshold rules for the grid node selection and through parameters in the excess capacity grid workload request. For example, in some examples, grid nodes can be further limited to those that correspond to a time window, for example, in the time zone where the grid node is utilized for the production workload 139. The time zone where the grid node is utilized is not necessarily where the node is physically located. The grid virtual gateway 163 can use the grid node data 169 as reported by the grid orchestration client 155 and stored by the grid orchestration server 165, in order to identify the subset of the grid nodes in view of the predetermined threshold rules for the grid node selection and the request parameters.

In step 215, the grid orchestration server 165 can transmit to grid orchestration clients 155 of respective grid nodes, one or more commands to install the grid workload 159 and prerequisite software components such as the CPU-based algorithmic acceleration client 157. The grid orchestration server 165 can perform this concurrently or with partial concurrence for all of the grid nodes selected for the grid workload 159. The grid virtual gateway 163 can instruct the grid orchestration server 165 to install the CPU-based algorithmic acceleration client 157 and the grid workload 159 individually or together in a single request. In the example of a single request, an installation package with one or more installable components can be transmitted along with a script that configures the components to interact with each other and the grid server components 161. In the example of multiple requests, each component can include an individual installable component and a script that the grid orchestration client 155 executes to configure that component.

As each installation process proceeds to completion on the grid node, the grid orchestration client 155 can report progress and completion back to the grid orchestration server 165. The grid virtual gateway 163 can expose an API that a client device 109 or the management service 120 can invoke to identify a percentage of grid nodes that have completed the installation. In some examples, the CPU-based algorithmic acceleration client 157 or other prerequisite software can be installed to completion on the selected subset of grid nodes; upon notification through a user interface of a client device 109 or a console user interface of the management service 120, a user can deploy one or more grid workloads 159 to these grid nodes. In other examples, one of the grid server components 161 can determine that the prerequisite software is installed on the selected subset of grid nodes, and can then cause the grid orchestration server 165 to deploy the grid workload 159.

The grid workload 159 can include an independent workload for a single grid node, or can include a distributed workload that is executed using multiple grid nodes. In the example of a distributed grid workload 159, the CPU-based algorithmic acceleration server 167 (or other prerequisite software such as a server side of a server/client distributed video transcoding application) can fragment or separate the grid workload 159 into separate chunks for execution by the various different grid nodes. The grid orchestration server 165 can transmit these separate chunks to the various different grid nodes.

In step 218, the grid orchestration clients 155 can install the CPU-based algorithmic acceleration client 157 and the grid workload 159 on the grid node. The grid orchestration clients 155 can report progress and completion back to the grid orchestration server 165. The grid orchestration clients 155 can configure all software to execute at the lowest priority level available to the grid node, or a lower priority than the production processes 151 executed on that grid node. This can prevent the grid workload 159 from slowing down the higher priority production processes 151.

As an additional or alternative precaution, the grid orchestration client 155 can identify grid node resource usage and implement usage policy rules. For example, the grid orchestration client 155 can decline to install and/or execute a grid workload 159 until overall usage or production workload 139 usage is below a predetermined percentage of total resources reported for the node, such as 30% or another deployment or execution threshold. The grid orchestration client 155 can halt or suspend the grid workload 159 if the other processes excluding the grid workload 159 are beyond a suspension threshold such as 70% or another value. The grid orchestration client 155 can then resume the grid workload 159 if the other processes excluding the grid workload 159 are below a resumption threshold such as 50% or another value. In some examples, the execution threshold can be used as the resumption threshold.

In step 221, the grid workload 159, which can include the CPU-based algorithmic acceleration client 157, can transmit results of the grid workload 159 back to the grid server components 161. Since the grid workload 159 can include a distributed workload executed in separate fragments or chunks. In the example of a distributed grid workload 159, the CPU-based algorithmic acceleration server 167 receives results from the separate chunks from the various different grid nodes, and the CPU-based algorithmic acceleration server 167 can form a final result from the chunks.

Once the grid workload 159 or respective chunk is performed and the results are received by the grid server components 161, the corresponding grid orchestration client 155 can remove the grid workload 159 and the prerequisite software from the grid node. However, in some examples, the prerequisite software remains installed for use by other grid workloads 159.

Figure 3:
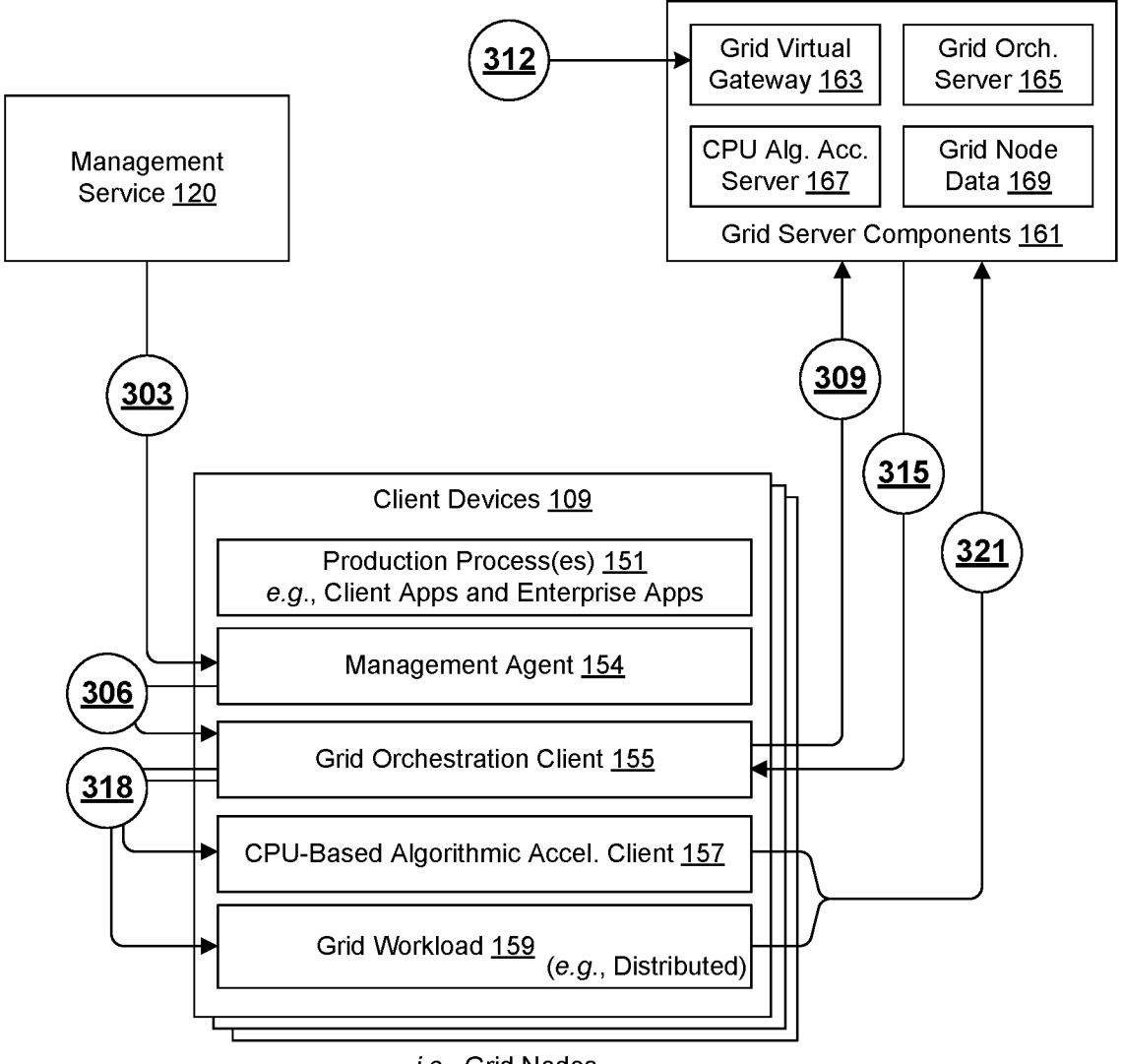
FIG. 3 is a drawing illustrating example functionalities performed by components of the networked environment to provide an excess capacity grid for lower priority processes, according to various examples of the disclosure.

FIG. 3 shows an example of the operation of the components of the networked environment 100 providing an excess capacity grid for grid workloads 159. Generally, this figure shows how components of the networked environment 100 can form grid nodes using managed client devices 109 that include the management agent 154. While particular steps can be described as performed by a particular component, other components can additionally or alternatively perform the functionalities discussed.

In step 303, the management service 120 can transmit a command or request for the management agent 154 to install and execute a grid orchestration client 155 on the client device 109. The client device 109 or its operating system can require administrative or privileged credentials to install and execute applications. The command to install and execute the grid orchestration client 155 can include instructions and other data that configure the grid orchestration client 155 to register with and communicate with the grid orchestration server 165. The configuration data for of the grid orchestration client 155 can include a network address of the grid orchestration server 165 and credentials to authenticate the grid orchestration client 155 with the grid orchestration server 165.

In step 306, the management agent 154 can install and execute the grid orchestration client 155 on the client device 109. This can cause the client device 109 to be available as an excess capacity grid node. The management agent 154 can include the credentials or can operate at a privilege level based on the credentials, enabling the management agent 154 to install and execute the grid orchestration client 155.

In step 309, the grid orchestration client 155 can register and communicate with the grid orchestration server 165. Initially, the grid orchestration client 155 can communicate with the grid orchestration server 165 using the network address and authenticate this communication using the credentials from the orchestration client configuration data. In some examples this can be considered a registration request. Thereafter, the grid orchestration server 165 and the grid orchestration client 155 can communicate with one another using asynchronous messaging. The grid orchestration client 155 can identify the total CPU capacity and memory capacity of the client device 109 and report this to the grid orchestration server 165. The CPU capacity can refer to a physical number of CPUs of the client device 109, a number correlated with an efficacy or speed score of the CPU or CPUs of the client device 109, or another measure of CPU capacity. The grid orchestration server 165 can create a new grid node identifier or use a network address or another parameter of the grid orchestration client 155 as a grid node identifier and can store the total CPU and memory capacity in the grid node data 169 in association with this identifier. The identifier can be universally unique or unique among all grid nodes associated with this grid orchestration server 165 instance.

In step 312, the grid virtual gateway 163 can receive a request to use the excess capacity grid to execute a grid workload 159 and/or its prerequisite software components. The grid virtual gateway 163 can expose an API that can be invoked using a request that specifies a node parameter such as a specific number of nodes, or a friendly name associated with a relative resource requirement of the grid workload 159. The request can also specify the grid workload 159 by an identifier associated with the grid workload 159, a network address where the grid workload 159 can be downloaded, or the grid workload 159 can be included within the request. The request can also specify a minimum resource requirement including a minimum CPU capacity and a minimum memory capacity for the grid workload 159.

The grid virtual gateway 163 can use the parameters of the request to identify a subset of grid nodes to execute the grid workload 159 as a distributed application. This can include interaction with the other grid server components 161. The grid server components 161 can, based on the request, identify a set of all grid nodes that correspond to the minimum CPU capacity and a minimum memory capacity for the grid workload 159. In other words, the grid server components 161 can identify the subset of the grid nodes that have a respective CPU capacity and memory capacity equal to or greater than the specified minimum CPU capacity and a minimum memory capacity.

The grid server components 161 can also identify, for each grid node, a most recent reported usage data measure corresponding to any measure such as a most recent instantaneous usage value, a most recent average over a certain period of time, or another most recent statistical measure.

This measure of resource usage can be expressed as a percentage of total capacity. The grid server components 161 can identify a subset of the grid nodes that are at or below a predetermined threshold usage measure for one or more resources including CPU and memory.

The grid server components 161 can ultimately select a subset of the grid nodes that both (1) correspond to the minimum total CPU capacity and a minimum total memory capacity for the grid workload 159, and (2) are at or below a predetermined threshold usage measure for one or more resources including the CPU and memory. Additional considerations can also be specified in predetermined threshold rules for the grid node selection and through parameters in the excess capacity grid workload request. For example, in some examples, grid nodes can be further limited to those that correspond to a time window, for example, in the time zone where the grid node is utilized for the production workload 139. The time zone where the grid node is utilized is not necessarily where the node is physically located. The grid virtual gateway 163 can use the grid node data 169 as reported by the grid orchestration client 155 and stored by the grid orchestration server 165, in order to identify the subset of the grid nodes in view of the predetermined threshold rules for the grid node selection and the request parameters.

In step 315, the grid orchestration server 165 can transmit to grid orchestration clients 155 of respective grid nodes, one or more commands to install the grid workload 159 and prerequisite software components such as the CPU-based algorithmic acceleration client 157. The grid orchestration server 165 can perform this concurrently or with partial concurrence for all of the grid nodes selected for the grid workload 159. The grid virtual gateway 163 can instruct the grid orchestration server 165 to install the CPU-based algorithmic acceleration client 157 and the grid workload 159 individually or together in a single request. In the example of a single request, an installation package with one or more installable components can be transmitted along with a script that configures the components to interact with each other and the grid server components 161. In the example of multiple requests, each component can include an individual installable component and a script that the grid orchestration client 155 executes to configure that component.

As each installation process proceeds to completion on the grid node, the grid orchestration client 155 can report the progress and completion back to the grid orchestration server 165. The grid virtual gateway 163 can expose an API that a client device 109 or the management service 120 can invoke to identify a percentage of grid nodes that have completed the installation. In some examples, the CPU-based algorithmic acceleration client 157 or another prerequisite software can be installed to completion on the selected subset of grid nodes; upon notification through a user interface of a client device 109 or a console user interface of the management service 120, a user can deploy one or more grid workloads 159 to these grid nodes. In other examples, one of the grid server components 161 can determine that the prerequisite software is installed on the selected subset of grid nodes, and can then cause the grid orchestration server 165 to deploy the grid workload 159.

The grid workload 159 can include an independent workload for a single grid node, or can include a distributed workload that is executed using multiple grid nodes. In the example of a distributed grid workload 159, the CPU-based algorithmic acceleration server 167 (or other prerequisite software such as a server side of a server/client distributed video transcoding application) can fragment or separate the grid workload 159 into separate chunks for execution by the various different grid nodes. The grid orchestration server 165 can transmit these separate chunks to the various different grid nodes.

In step 318, the grid orchestration clients 155 can install the CPU-based algorithmic acceleration client 157 and the grid workload 159 on the grid node. The grid orchestration clients 155 can report progress and completion back to the grid orchestration server 165. The grid orchestration client 155 can configure all software to execute at the lowest priority level available to the grid node, or a lower priority than the production processes 151 executed on that grid node. This can prevent the grid workload 159 from slowing down the higher priority production processes 151.

As an additional or alternative precaution, the grid orchestration client 155 can identify grid node resource usage and implement usage policy rules. For example, the grid orchestration client 155 can decline to install and/or execute a grid workload 159 until overall usage or production workload 139 usage is below a predetermined percentage of total resources reported for the node, such as 30% or another deployment or execution threshold. The grid orchestration client 155 can halt or suspend the grid workload 159 if the other processes excluding the grid workload 159 are beyond a suspension threshold such as 70% or another value. The grid orchestration client 155 can then resume the grid workload 159 if the other processes excluding the grid workload 159 are below a resumption threshold such as 50% or another value. In some examples, the execution threshold can be used as the resumption threshold.

In step 321, the grid workload 159, which can include the CPU-based algorithmic acceleration client 157, can transmit results of the grid workload 159 back to the grid server components 161. Since the grid workload 159 can include a distributed workload executed in separate fragments or chunks. In the example of a distributed grid workload 159, the CPU-based algorithmic acceleration server 167 receive results from the separate chunks from the various different grid nodes, and the CPU-based algorithmic acceleration server 167 can form a final result from the chunks.

Once the grid workload 159 or respective chunk is performed and the results are received by the grid server components 161, the corresponding grid orchestration client 155 can remove the grid workload 159 and the prerequisite software from the grid node. However, in some examples, the prerequisite software remains installed for use by other grid workloads 159.

Figure 4:
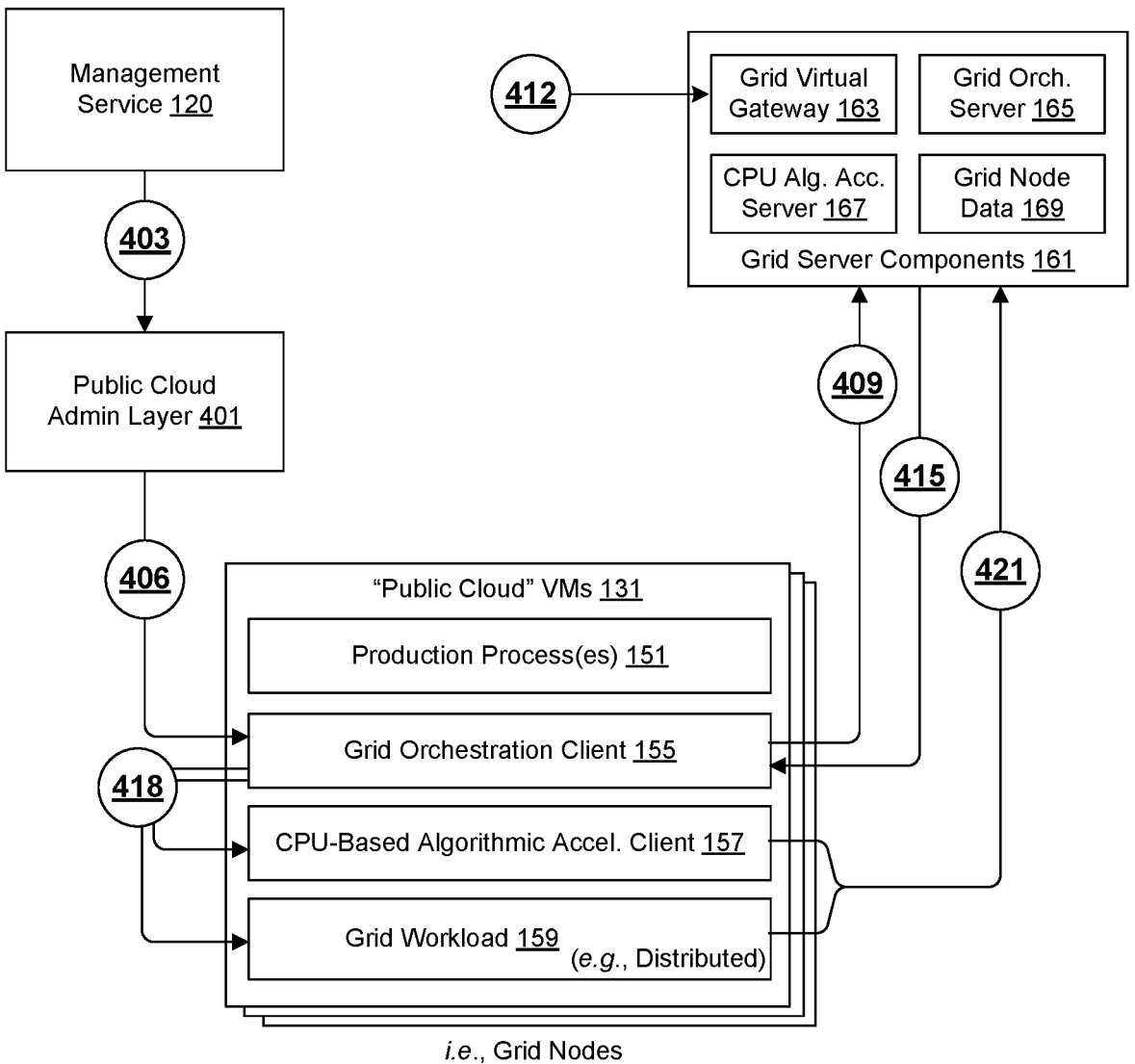
FIG. 4 is another drawing illustrating example functionalities performed by components of the networked environment to provide an excess capacity grid for lower priority processes, according to various examples of the disclosure.

FIG. 4 shows an example of the operation of the components of the networked environment 100 providing an excess capacity grid for grid workloads 159. Generally, this figure shows how components of the networked environment 100 can form grid nodes using public cloud virtual machines 131 that lack the management processes 153. While particular steps can be described as performed by a particular component, other components can additionally or alternatively perform the functionalities discussed.

In step 403, the management service 120 can transmit one or more commands or requests to a public cloud administration layer 401 to install and execute a grid orchestration client 155 on the virtual machine 131 or a set of virtual machines 131. This request can include a network address and credentials for the public cloud administration layer 401 that oversees the set of public cloud virtual machines 131. The management service 120 can include or use a cloud configuration tool that is capable of interfacing with any API-driven system such as a public cloud administration layer 401 of a public cloud that includes the virtual machines 131.

In step 406, the public cloud administration layer 401 can install and execute the grid orchestration client 155 on the virtual machine 131. This can cause the virtual machine 131 to be available as an excess capacity grid node. In some examples, the cloud configuration tool can be a tool that runs repeatedly to converge on the target cloud's desired state. As a result, the process referred to as installing and executing the grid orchestration client 155 on the virtual machine can include an iterative process where the desired state is provided to the cloud configuration tool, which can invoke APIs of the public cloud administration layer 401 to identify a current state, and then invoke other APIs of the public cloud administration layer 401 to adjust that state towards the desired state. This can run repeatedly to converge on the desired state.

In step 409, the grid orchestration client 155 can register and communicate with the grid orchestration server 165. Initially, the grid orchestration client 155 can communicate with the grid orchestration server 165 using the network address and authenticate this communication using the credentials from the orchestration client configuration data. In some examples this can be considered a registration request. Thereafter, the grid orchestration server 165 and the grid orchestration client 155 can communicate with one another using asynchronous messaging. The grid orchestration client 155 can identify the total CPU capacity and memory capacity of the virtual machine 131 and report this to the grid orchestration server 165. The CPU capacity can refer to a physical number of CPUs of the virtual machine 131, a number correlated with an efficacy or speed score of the CPU or CPUs of the virtual machine 131, or another measure of CPU capacity. The grid orchestration server 165 can create a new grid node identifier or use a network address or another parameter of the grid orchestration client 155 as a grid node identifier, and can store the total CPU and memory capacity in the grid node data 169 in association with this identifier. The identifier can be universally unique or unique among all grid nodes associated with this grid orchestration server 165 instance.

In step 412, the grid virtual gateway 163 can receive a request to use the excess capacity grid to execute a grid workload 159 and/or its prerequisite software components. The grid virtual gateway 163 can expose an API that can be invoked using a request that specifies a node parameter such as a specific number of nodes, or a friendly name associated with a relative resource requirement of the grid workload 159. The request can also specify the grid workload 159 by an identifier associated with the grid workload 159, a network address where the grid workload 159 can be downloaded, or the grid workload 159 can be included within the request. The request can also specify a minimum resource requirement including a minimum CPU capacity and a minimum memory capacity for the grid workload 159.

The grid virtual gateway 163 can use the parameters of the request to identify a subset of grid nodes to execute the grid workload 159 as a distributed application. This can include interaction with the other grid server components 161. The grid server components 161 can, based on the request, identify a set of all grid nodes that correspond to the minimum CPU capacity and a minimum memory capacity for the grid workload 159. In other words, the grid server components 161 can identify the subset of the grid nodes that have a respective CPU capacity and memory capacity equal to or greater than the specified minimum CPU capacity and a minimum memory capacity.

The grid server components 161 can also identify, for each grid node, a most recent reported usage data measure corresponding to any measure such as a most recent instantaneous usage value, a most recent average over a certain period of time, or another most recent statistical measure. This measure of resource usage can be expressed as a percentage of total capacity. The grid server components 161 can identify a subset of the grid nodes that are at or below a predetermined threshold usage measure for one or more resources including CPU and memory.

The grid server components 161 can ultimately select a subset of the grid nodes that both (1) correspond to the minimum total CPU capacity and a minimum total memory capacity for the grid workload 159, and (2) are at or below a predetermined threshold usage measure for one or more resources including CPU and memory. Additional considerations can also be specified in predetermined threshold rules for grid node selection and through parameters in the excess capacity grid workload 159 request. For example, in some examples, grid nodes can be further limited to those that correspond to a time window, for example, in the time zone where the grid node is utilized for the production workload 139. The time zone where the grid node is utilized is not necessarily where the node is physically located. The grid virtual gateway 163 can use the grid node data 169 as reported by the grid orchestration client 155 and stored by the grid orchestration server 165, in order to identify the subset of the grid nodes in view of the predetermined threshold rules for grid node selection and the request parameters.

In step 415, the grid orchestration server 165 can transmit to grid orchestration clients 155 of respective grid nodes, one or more commands to install the grid workload 159 and prerequisite software components such as the CPU-based algorithmic acceleration client 157. The grid orchestration server 165 can perform this concurrently or with partial concurrence for all of the grid nodes selected for the grid workload 159. The grid virtual gateway 163 can instruct the grid orchestration server 165 to install the CPU-based algorithmic acceleration client 157 and the grid workload 159 individually or together in a single request. In the example of a single request, an installation package with one or more installable components can be transmitted along with a script that configures the components to interact with each other and the grid server components 161. In the example of multiple requests, each component can include an individual installable component and a script that the grid orchestration client 155 executes to configure that component.

As each installation process proceeds to completion on the grid node, the grid orchestration client 155 can report progress and completion back to the grid orchestration server 165. The grid virtual gateway 163 can expose an API that a client device 109 or the management service 120 can invoke to identify a percentage of grid nodes that have completed the installation. In some examples, the CPU-based algorithmic acceleration client 157 or other prerequisite software can be installed to completion on all of the selected subsets of grid nodes; upon notification through a user interface of a client device 109 or a console user interface of the management service 120, a user can deploy one or more grid workloads 159 to these grid nodes. In other examples, one of the grid server components 161 can determine that the prerequisite software is installed on all of the selected subsets of grid nodes, and can then cause the grid orchestration server 165 to deploy the grid workload 159.

The grid workload 159 can include an independent workload for a single grid node, or can include a distributed workload that is executed using multiple grid nodes. In the example of a distributed grid workload 159, the CPU-based algorithmic acceleration server 167 (or other prerequisite software such as a server side of a server/client distributed video transcoding application) can fragment or separate the grid workload 159 into separate chunks for execution by the various different grid nodes. The grid orchestration server 165 can transmit these separate chunks to the various different grid nodes.

In step 418, the grid orchestration clients 155 can install the CPU-based algorithmic acceleration client 157 and the grid workload 159 on the grid node. The grid orchestration clients 155 can report progress and completion back to the grid orchestration server 165. The grid orchestration client 155 can configure all software to execute at the lowest priority level available to the grid node, or a lower priority than the production processes 151 executed on that grid node. This can prevent the grid workload 159 from slowing down the higher priority production processes 151.

As an additional or alternative precaution, the grid orchestration client 155 can identify grid node resource usage and implement usage policy rules. For example, the grid orchestration client 155 can decline to install and/or execute a grid workload 159 until overall usage or production workload 139 usage or non-grid workload usage is below a predetermined percentage of total resources reported for the node, such as 30% or another deployment or execution threshold. The grid orchestration client 155 can halt or suspend the grid workload 159 if the other processes excluding the grid workload 159 are beyond a suspension threshold such as 70% or another value. The grid orchestration client 155 can then resume the grid workload 159 if the other processes excluding the grid workload 159 are below a resumption threshold such as 50% or another value. In some examples, the execution threshold can be used as the resumption threshold.

In step 421, the grid workload 159, which can include the CPU-based algorithmic acceleration client 157, can transmit results of the grid workload 159 back to the grid server components 161. Since the grid workload 159 can include a distributed workload executed in separate fragments or chunks. In the example of a distributed grid workload 159, the CPU-based algorithmic acceleration server 167 receive results from the separate chunks from the various different grid nodes, and the CPU-based algorithmic acceleration server 167 can form a final result from the chunks.

Once the grid workload 159 or respective chunk is performed and the results are received by the grid server components 161, the corresponding grid orchestration client 155 can remove the grid workload 159 and the prerequisite software from the grid node. However, in some examples, the prerequisite software remains installed for use by other grid workloads 159.

Figure 5:
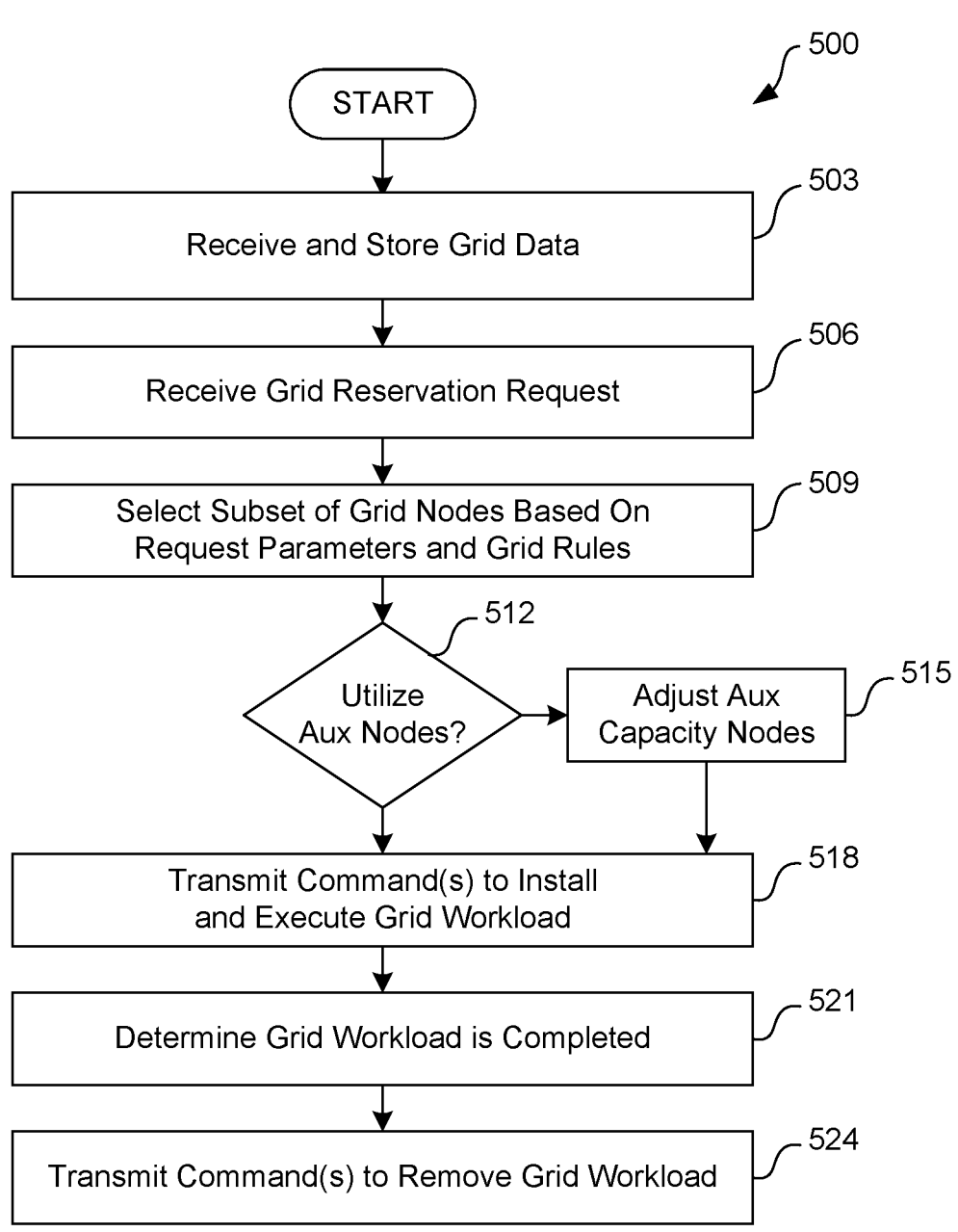
FIG. 5 is a flowchart illustrating additional example functionalities performed by components of the networked environment to provide an excess capacity grid for lower priority processes, according to various examples of the disclosure.

FIG. 5 includes a flowchart 500 that shows functionalities performed by components of the networked environment 100. Generally, the flowchart 500 indicates how the grid server components 161 work in concert with other components of the networked environment to execute a grid workload 159 on an excess capacity grid. While the actions of the steps can be described as performed by a particular device or component, other components of the networked environment 100 can also perform aspects of the steps and actions.

In step 503, the grid server components 161 can receive and store grid node data 169. The management service 120 can direct multiple virtual machines 131 and client devices 109 to install respective grid orchestration clients 155. The grid orchestration clients 155 can be configured to authenticate and communicate with a particular grid orchestration server 165. The grid orchestration client 155 that can identify the total CPU capacity and memory capacity of the virtual machine 131 and report this to the grid orchestration server 165. The grid orchestration client 155 can also periodically identify and report resource usage information including non-grid workload usage if a grid workload 159 is executed. The grid server components 161 can store this information in the grid node data 169.

In step 506, the grid server components 161 can receive a grid reservation request. The grid virtual gateway 163 can expose an API that can be invoked using a request that specifies a node parameter such as a specific number of nodes, or a friendly name associated with a relative resource requirement of the grid workload 159. The request can also specify the grid workload 159 by an identifier associated with the grid workload 159, a network address where the grid workload 159 can be downloaded, or the grid workload 159 can be included within the request. The request can also specify a minimum resource requirement including a minimum CPU capacity and a minimum memory capacity for the grid workload 159.

In step 509, the grid server components 161 can select a subset of grid nodes based on request parameters and grid rules. The grid server components 161 can use the parameters of the request to identify a subset of grid nodes to execute the grid workload 159 as a distributed application. The grid server components 161 can identify a set of all grid nodes that correspond to the minimum CPU capacity and a minimum memory capacity for the grid workload 159. The grid server components 161 can identify a subset of the grid nodes that are at or below a predetermined threshold usage measure for one or more resources including CPU and memory. The grid server components 161 can ultimately select a subset of the grid nodes that both (1) correspond to the minimum total CPU capacity and a minimum total memory capacity for the grid workload 159, and (2) are at or below a predetermined threshold usage measure for one or more resources including CPU and memory. Additional considerations can also be specified in predetermined threshold rules for grid node selection and through parameters in the excess capacity grid workload request. For example, in some examples, grid nodes can be further limited to those that correspond to a time window, for example, during a time window when the grid node is not currently being utilized for the production workload 139. In some examples the time window can correspond to a subset of non-working or non-business hours for a time zone where the grid node is assigned or used.

In step 512, the grid server components 161 can determine whether to utilize auxiliary nodes 191. The grid server components 161 can determine that auxiliary nodes 191 are to be used additionally or alternatively to the excess capacity grid nodes. Excess capacity grid nodes can be those grid nodes supplied by the virtual machines 131 and client devices 109 that also perform production processes 151 of production workloads 139. The grid server components 161 can reference the grid node data 169 to determine whether the grid workload 159 can be executed using the current capacity of the excess capacity grid nodes that correspond to the minimum CPU capacity and a minimum memory capacity for the grid workload 159. If current capacity is insufficient, then auxiliary nodes 191 can be used for the requested grid workload 159. Otherwise, if current capacity is sufficient, then auxiliary nodes 191 are not used for the requested grid workload 159.

In step 515, the grid server components 161 can dynamically adjust a capacity of the auxiliary nodes 191 to match an additional capacity requirement of the requested grid workload 159, along with any other grid workloads 159 that are executed using the auxiliary nodes 191. In some examples, once a grid workload 159 is installed and executed on auxiliary nodes 191, it remains there until completed. However, in other examples, the requested grid workload 159, or fraction thereof executed using a particular auxiliary node 191, can be transferred to an excess capacity grid node once the current available resources are sufficient, or crosses a migration threshold for grid workloads 159 executed using auxiliary nodes 191.

In step 518, the grid server components 161 can transmit to grid orchestration clients 155 of respective grid nodes, one or more commands to install the grid workload 159 and prerequisite software components such as the CPU-based algorithmic acceleration client 157. This can refer to excess capacity grid nodes that also execute production workloads 139, as well as any auxiliary nodes 191 that are to be used. The grid orchestration server 165 can perform this concurrently or with partial concurrence for all of the grid nodes selected for the grid workload 159. The grid virtual gateway 163 can instruct the grid orchestration server 165 to install the CPU-based algorithmic acceleration client 157 and the grid workload 159 individually or together in a single request.

In step 521, the grid server components 161 can determine that the grid workload 159 is completed. The grid workload 159 or a prerequisite software package can report that the grid workload 159 is completed. In some examples, this can include returning data embodying a workload result of executing the grid workload 159. Since the grid workload 159 can be a distributed workload, in practice the workload result and the completion can refer to a particular fragment or chunk relative to the overall grid workload 159.

In step 524, the grid server components 161 can transmit a command to remove the grid workload 159 from the grid node that has reported completion or provided the workload result. In some examples, the prerequisite software can also be removed once the grid workload 159 is completed.

Figure 6:
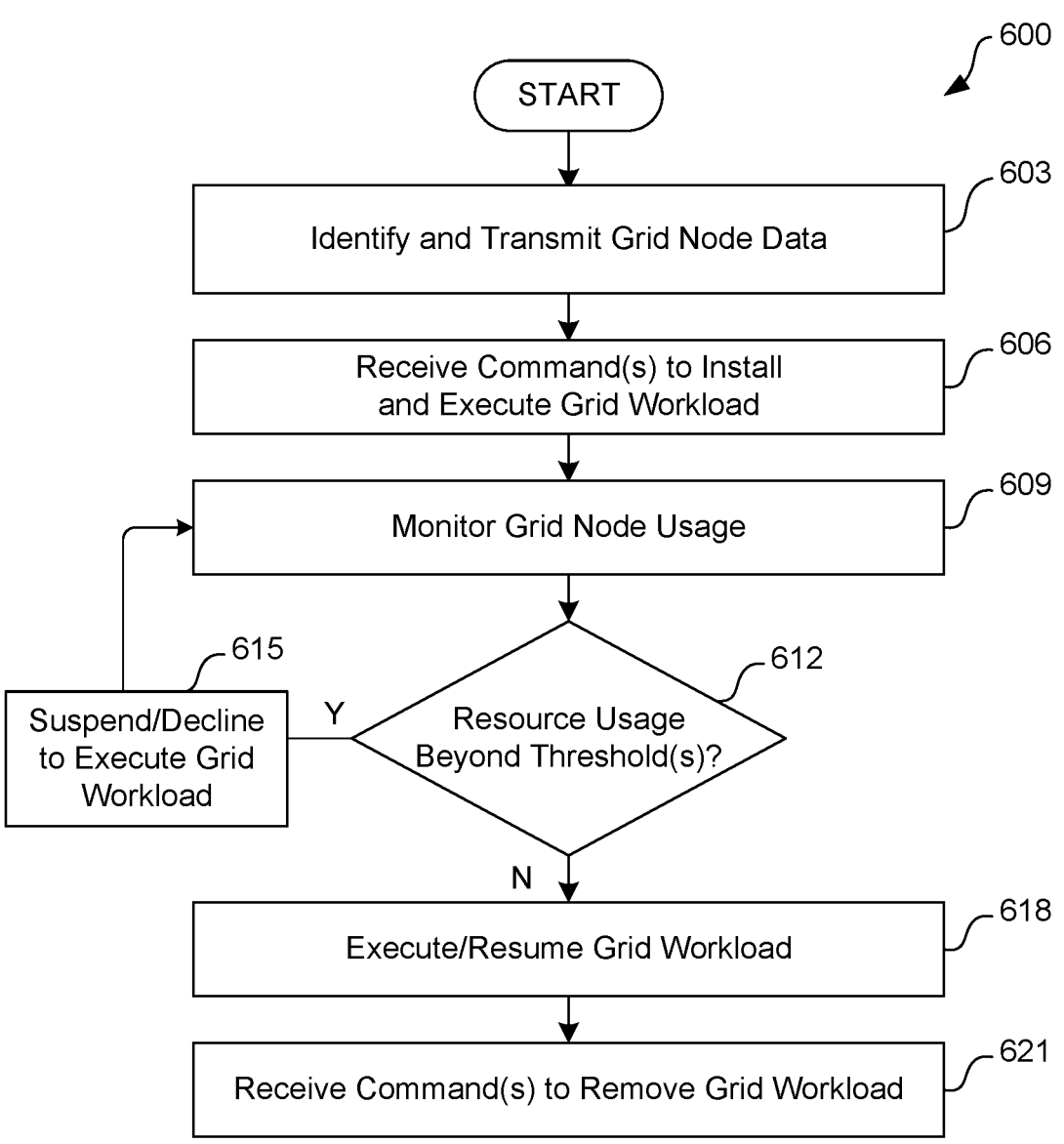
FIG. 6 is another flowchart illustrating additional example functionalities performed by components of the networked environment to provide an excess capacity grid for lower priority processes, according to various examples of the disclosure.

FIG. 6 includes a flowchart 600 that shows functionalities performed by components of the networked environment 100. Generally, the flowchart 600 indicates how the grid orchestration client 155 works in concert with other components of the networked environment 100 to execute at least a portion of the grid workload 159 on an excess capacity grid node. While the actions of the steps can be described as performed by a particular device or component, other components of the networked environment 100 can also perform aspects of the steps and actions.

In step 603, the grid orchestration client 155 can identify and transmit grid node data 169 to the grid orchestration server 165. The grid orchestration clients 155 can be configured to authenticate and communicate with a particular grid orchestration server 165. The grid orchestration client 155 can identify the total CPU capacity and memory capacity of the virtual machine 131 and report this to the grid orchestration server 165. The grid orchestration client 155 can also periodically identify and report resource usage information including non-grid workload usage if a grid workload 159 is executed. The grid server components 161 can receive and store this information in the grid node data 169.

In step 606, the grid orchestration client 155 can receive one or more commands to install the grid workload 159 and prerequisite software components such as the CPU-based algorithmic acceleration client 157. This can include installing one or more installation packages and one or more configuration scripts that configure the various components as desired. The grid orchestration client 155 can install the various components and report completion status information back to the grid server components 161. The grid orchestration client 155 can cause the grid node to execute the grid workload 159 at the lowest priority level available, or at a lower priority than any other process in the grid node.

In step 609, the grid orchestration client 155 can continue to monitor grid node usage. This can include identifying and periodically reporting resource usage information including grid workload usage relative to total capacity, non-grid workload usage relative to total capacity, and so on as described.

In step 612, the grid orchestration client 155 can determine if resource usage crosses any one of a number of potentially relevant thresholds. The thresholds can correspond to resource usage rules for grid workloads 159. Initially, in some implementations, the grid orchestration client 155 can move to step 615 and decline to launch a newly installed grid workload 159 if the non-grid workload usage is over a first threshold. Otherwise, if the non-grid workload usage is below the first threshold, then the grid orchestration client 155 can execute the grid workload in step 618. However, once the grid workload 159 is executing the grid orchestration client 155 can refer to a second threshold. The grid orchestration client 155 can move to step 615 and suspend the grid workload 159 if the non-grid workload usage is over the second threshold The grid orchestration client 155 can then monitor resource usage and if the non-grid workload usage is below a resumption threshold then the grid orchestration client 155 can resume the grid workload in step 618.

In step 621, the grid orchestration client 155 can receive a command or request to remove the grid workload 159 from the grid node. The grid orchestration client 155 can then remove the grid workload 159 by deleting the grid workload 159 or adjusting the grid node to a particular desired state. This can include an iterative process or a single process.

Functionality attributed to the executable components discussed herein can be implemented in a single process or application or in multiple processes or applications. The separation or segmentation of functionality as discussed herein is presented for illustrative purposes only.

Flowcharts and sequence diagrams can show examples of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts and sequence diagrams can show a specific order of execution, it is understood that the order of execution can differ from that which is shown. For example, the order of execution of two or more elements can be switched relative to the order shown. Also, two or more elements shown in succession can be executed concurrently or with partial concurrence. Further, in some examples, one or more of the elements shown in the flowcharts can be skipped or omitted.

The computing devices and other hardware components described herein can include at least one processing circuit. Such a processing circuit can include, for example, one or more processors and one or more storage devices that are coupled to a local interface. The local interface can include, for example, a data bus with an accompanying address/control bus or any other suitable bus structure.

The one or more storage devices for a processing circuit can store data or components that are executable by the one or more processors of the processing circuit. For example, the various executable software components can be stored in one or more storage devices and be executable by one or more processors. Also, a data store can be stored in the one or more storage devices.

The functionalities described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more of the components described herein that include software or program instructions can be embodied in any non-transitory computer-readable medium for use by or in connection with an instruction execution system such as a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in at least one computing device or by using multiple computing devices.

As used herein, "about," "approximately," and the like, when used in connection with a numerical variable, can generally refer to the value of the variable and to all values of the variable that are within the experimental error (e.g., within the 95% confidence interval for the mean) or within +/−10% of the indicated value, whichever is greater.

Where a range of values is provided, it is understood that each intervening value and intervening range of values, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All such modifications and variations are intended to be included herein within the scope of this disclosure.

Therefore, the following is claimed:

1. A non-transitory computer readable medium embodying instructions executable in at least one computing device that, wherein the instructions, when executed by the at least one computing device, cause the at least one computing device to at least:

install, by a management tool preinstalled on a virtual machine or a physical device that performs at least one production workload for an enterprise based at least in part on and a privilege level at which the management tool executes or privileged credentials accessible to the management tool, a grid orchestration client that communicates with a grid orchestration server to form at least a portion of an excess capacity grid that performs grid workloads at a priority level equal to or lower than the at least one production workload;

receive, by the grid orchestration client from the grid orchestration server, a request to execute a grid workload;

launch, by the grid orchestration client, the grid workload on the virtual machine or the physical device; and transmit, from the virtual machine or the physical device, a workload result of the grid workload to a grid server component of the excess capacity grid.

2. The non-transitory computer readable medium of claim 1, wherein the instructions, when executed by the at least one computing device, cause the at least one computing device to at least:

transmit, by the grid orchestration client to the grid orchestration server, grid node resource usage data corresponding to resource usage of the virtual machine or the physical device.

3. The non-transitory computer readable medium of claim 1, wherein the instructions, when executed by the at least one computing device, cause the at least one computing device to at least:

receive, from a management service, by a management component of the virtual machine or the physical device, a request to install the grid orchestration client.

4. The non-transitory computer readable medium of claim 3, wherein the management component comprises the management tool.

5. The non-transitory computer readable medium of claim 3, wherein the management component comprises a management agent that is executed on the physical device, wherein the management agent is enabled to install the grid orchestration client based at least in part on: a privilege level at which the management agent executes, or privileged credentials accessible to the management agent.

6. The non-transitory computer readable medium of claim 1, wherein the grid orchestration client is installed using a public cloud administration layer that receives a request to install the grid orchestration client, and the request to install the grid orchestration client comprises public cloud administrative credentials.

7. The non-transitory computer readable medium of claim 1, wherein the grid orchestration client launches the grid workload within a sandboxed environment.

8. A system, comprising:

at least one computing device; and instructions executable in the at least one computing device that, wherein the instructions, when executed by the at least one computing device, cause the at least one computing device to at least:

install, by a management tool preinstalled on a virtual machine or a physical device that performs at least one production workload for an enterprise based at least in part on and a privilege level at which the management tool executes or privileged credentials accessible to the management tool, a grid orchestration client that communicates with a grid orchestration server to form at least a portion of an excess capacity grid that performs grid workloads at a priority level equal to or lower than the at least one production workload;

receive, by the grid orchestration client from the grid orchestration server, a request to execute a grid workload;

launch, by the grid orchestration client, the grid workload on the virtual machine or the physical device; and transmit, from the virtual machine or the physical device, a workload result of the grid workload to a grid server component of the excess capacity grid.

9. The system of claim 8, wherein the instructions, when executed by the at least one computing device, cause the at least one computing device to at least:

transmit, by the grid orchestration client to the grid orchestration server, grid node resource usage data corresponding to resource usage of the virtual machine or the physical device.

10. The system of claim 8, wherein the instructions, when executed by the at least one computing device, cause the at least one computing device to at least:

receive, from a management service, by a management component of the virtual machine or the physical device, a request to install the grid orchestration client.

11. The system of claim 10, wherein the management component comprises the management tool.

12. The system of claim 10, wherein the management component comprises a management agent that is executed on the physical device, wherein the management agent is enabled to install the grid orchestration client based at least in part on: a privilege level at which the management agent executes, or privileged credentials accessible to the management agent.

13. The system of claim 8, wherein the grid orchestration client is installed using a public cloud administration layer that receives a request to install the grid orchestration client, and the request to install the grid orchestration client comprises public cloud administrative credentials.

14. The system of claim 8, wherein the grid orchestration client launches the grid workload at a privilege level that is equal to or lower than that of the at least one production workload.

15. A method comprising:

installing, by a management tool preinstalled on a virtual machine or a physical device that performs at least one production workload for an enterprise based at least in part on and a privilege level at which the management tool executes or privileged credentials accessible to the management tool, a grid orchestration client that communicates with a grid orchestration server to form at least a portion of an excess capacity grid that performs grid workloads at a priority level equal to or lower than the at least one production workload;

receiving, by the grid orchestration client from the grid orchestration server, a request to execute a grid workload; and launching, by the grid orchestration client, the grid workload on the virtual machine or the physical device.

16. The method of claim 15, further comprising:

transmitting, by the grid orchestration client to the grid orchestration server, grid node resource usage data corresponding to resource usage of the virtual machine or the physical device.

17. The method of claim 15, further comprising:

receiving, from a management service, by a management component of the virtual machine or the physical device, a request to install the grid orchestration client.

18. The method of claim 17, wherein the management component comprises the management.

19. The method of claim 17, wherein the management component comprises a management agent that is executed on the physical device, wherein the management agent is enabled to install the grid orchestration client based at least in part on: a privilege level at which the management agent executes, or privileged credentials accessible to the management agent.

20. The method of claim 15, wherein the grid workload is executed using at least one auxiliary node provided using at least one container, in addition to another at least one node corresponding to the virtual machine or the physical device.

*   *   *   *   *